(12) United States Patent
Kim et al.

(10) Patent No.: US 12,226,689 B2
(45) Date of Patent: Feb. 18, 2025

(54) METHOD AND APPARATUS FOR GAME STREAMING

(71) Applicant: NCSOFT Corporation, Seoul (KR)

(72) Inventors: Hwan Kim, Seongnam-si (KR); Seung Uk Baek, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 16/934,639

(22) Filed: Jul. 21, 2020

(65) Prior Publication Data

US 2021/0308570 A1 Oct. 7, 2021

(30) Foreign Application Priority Data

Apr. 7, 2020 (KR) .......................... 10-2020-0042236

(51) Int. Cl.
*A63F 13/355* (2014.01)
*A63F 13/358* (2014.01)
*A63F 13/86* (2014.01)

(52) U.S. Cl.
CPC .......... *A63F 13/355* (2014.09); *A63F 13/358* (2014.09); *A63F 13/86* (2014.09)

(58) Field of Classification Search
CPC ....... A63F 13/355; A63F 13/358; A63F 13/86
See application file for complete search history.

(56) References Cited

U.S. PATENT DOCUMENTS

| 8,024,655 B2 | 9/2011 | Martin et al. |
| 8,902,970 B1 * | 12/2014 | McCuller ............. H04N 19/127 375/240.02 |
| 10,589,171 B1 | 3/2020 | Burke |
| 2011/0246661 A1 * | 10/2011 | Manzari ............... H04L 65/612 709/231 |
| 2012/0178536 A1 * | 7/2012 | Oh ......................... H04L 67/24 463/42 |

(Continued)

FOREIGN PATENT DOCUMENTS

| JP | 2003-009120 A | 1/2003 |
| JP | 2017-199994 A | 11/2017 |

(Continued)

OTHER PUBLICATIONS

Communication dated Jan. 27, 2021, in corresponding Taiwanese Patent Application No. 109122840, 11 pages.

(Continued)

*Primary Examiner* — William H McCulloch, Jr.
*Assistant Examiner* — Ankit B Doshi
(74) *Attorney, Agent, or Firm* — Sughrue Mion, PLLC

(57) ABSTRACT

A method and apparatus for game streaming are provided. The streaming method according to one embodiment includes generating a first image including a part of a plurality of screen elements constituting a game play image and a second image including a remaining part of the plurality of screen elements, determining an image quality of each of the first image and the second image such that the image quality of the first image is higher than or equal to the image quality of the second image, encoding each of the first image and the second image based on the determined image quality of each of the first image and the second image, and streaming the encoded first image and the encoded second image to a client device.

16 Claims, 5 Drawing Sheets

(56) References Cited

U.S. PATENT DOCUMENTS

| | | | |
|---|---|---|---|
| 2013/0203489 A1* | 8/2013 | Lyons | G07F 17/3209 |
| | | | 463/30 |
| 2014/0094302 A1* | 4/2014 | Wilkiewicz | A63F 13/60 |
| | | | 463/31 |
| 2014/0274368 A1* | 9/2014 | Cotter | A63F 13/87 |
| | | | 463/31 |
| 2017/0001112 A1* | 1/2017 | Gilmore | A63F 13/85 |
| 2017/0374375 A1 | 12/2017 | Markar et al. | |
| 2019/0314728 A1* | 10/2019 | Sullivan | A63F 13/795 |
| 2020/0306631 A1* | 10/2020 | Karlsson | A63F 13/352 |
| 2020/0353368 A1* | 11/2020 | Fujihara | A63F 13/86 |

FOREIGN PATENT DOCUMENTS

| | | |
|---|---|---|
| JP | 2020-503906 A | 2/2020 |
| JP | 2020-035455 A | 3/2020 |
| WO | 2018/179880 A1 | 10/2018 |

OTHER PUBLICATIONS

Communication dated Jul. 16, 2021 from the Korean Patent Office in Application No. 10-2020-0042236.
Communication dated Jul. 27, 2021 from the Japanese Patent Office in Application No. JP 2020-124151.

* cited by examiner

METHOD AND APPARATUS FOR GAME STREAMING

CROSS-REFERENCE TO RELATED APPLICATION(S)

This application claims the benefit under 35 USC § 119 (a) of Korean Patent Application No. 10-2020-0042236, filed on Apr. 7, 2020, in the Korean Intellectual Property Office, the entire disclosure of which is incorporated herein by reference for all purposes.

BACKGROUND

1. Field

The following description relates to a game streaming technology.

2. Description of Related Art

Recently, with the development of wired/wireless network technology, a game streaming service has been provided to enable users to play high-specification games even without a high-performance device. The game streaming service streams a game play image of a game executed on a remote high-performance device to a client device in use by a user, which plays the game play image, and transmits a user input based on a screen reproduced on the client device to the device in which the game is executed, so that the user input is reflected in the game, thereby enabling the user to play the high-specification game without being restricted by the performance of the client device.

The game streaming service needs to adjust the quality of the streamed image according to a network environment, but when the quality of the streamed image is lowered, there is a problem in that the clarity of the game play image played on the client device is degraded. In addition, when the quality of the streamed image is increased to ensure the clarity, the user input for game play is not immediately reflected in the game due to the encoding and decoding processing time and network transmission delay, and hence a problem arises in that the responsiveness of game play is degraded.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided a streaming method including generating a first image including a part of a plurality of screen elements constituting a game play image and a second image including a remaining part of the plurality of screen elements, determining an image quality of each of the first image and the second image such that the image quality of the first image is higher than or equal to the image quality of the second image, encoding each of the first image and the second image based on the determined image quality of each of the first image and the second image, and streaming the encoded first image and the encoded second image to a client device.

The first image may include one or more preset screen elements among the plurality of screen elements.

The one or more preset screen elements may include a user interface (UI) object.

The generating may include determining the part of the plurality screen elements based on a priority set for at least some of the plurality of screen elements and a network status of the client device.

The determining may include determining the image quality of the first image based on a preset image quality.

The determining may include determining the image quality of the first image such that the first image has the preset image quality.

The determining may include determining the image quality of the first image based on a network status of the client device such that the image quality of the first image is maintained higher than or equal to the preset image quality.

The determining may include determining the image quality of the second image based on a network status of the client device.

At least some of the plurality of screen elements may be determined based on an operation result executed by a game server.

In another general aspect, there is provided a streaming apparatus including one or more hardware processors and one or more communication interfaces, wherein the one or more hardware processors are configured to generate a first image including a part of a plurality of screen elements constituting a game play image and a second image including a remaining part of the plurality of screen elements, determine an image quality of each of the first image and the second image such that the image quality of the first image is higher than or equal to the image quality of the second image, encode each of the first image and the second image based on the determined image quality of each of the first image and the second image, and stream the encoded first image and the encoded second image to a client device.

The first image may include one or more preset screen elements among the plurality of screen elements.

The one or more preset screen elements may include a UI object.

The one or more processors may be further configured to determine the part of the plurality screen elements based on a priority set for at least some of the plurality of screen elements and a network status of the client device.

The one or more processors may be further configured to determine the image quality of the first image based on a preset image quality.

The one or more processors may be further configured to determine the image quality of the first image such that the first image has the preset image quality.

The one or more processors may be further configured to determine the image quality of the first image based on a network status of the client device such that the image quality of the first image is maintained higher than or equal to the preset image quality.

The one or more processors may be further configured to determine the image quality of the second image based on a network status of the client device.

At least some of the plurality of screen elements may be determined based on an operation result executed by a game server.

Other features and aspects will be apparent from the following detailed description, the drawings, and the claims.

Figure 1:
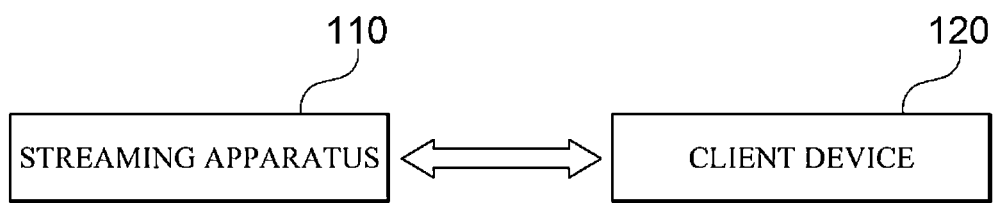
FIG. 1 is a diagram illustrating a configuration of a game streaming system according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a configuration of a game streaming system according to one embodiment.

Referring to FIG. 1, a game streaming system 100 according to one embodiment includes a streaming apparatus 110 and a client device 120.

According to one embodiment, the game streaming system 100 is a system for supporting game streaming to allow a user to play a game while viewing a game play image played on the client device 120 by streaming the game play image of the game, executed remotely according to a game manipulation signal received from the client device 120 based on a user input, to the client device 120.

The streaming apparatus 110 is a device for encoding a game play image of a game to be streamed, streaming the encoded game play image to the client device 120, and receiving a game manipulation signal generated based on a user input from the client device 120.

According to one embodiment, the streaming apparatus 110 may be a device that executes the game in response to the game manipulation signal received from the client device 120 and generates a game play image on the basis of an execution result of the game. For example, the streaming apparatus 110 may be a computing device, such as a desktop personal computer (PC), a game console, or the like, which is owned by the user of the client device 120. In this case, generation of the game play image and all operations required for executing the game may be performed by the streaming apparatus 110. However, in the case in which the game executed on the streaming apparatus 110 is an online game that is provided by interworking with a game server (not shown), at least some of the operations required for executing the game may be performed by the game server.

According to another embodiment, at least some of the operations required for executing the game may be distributively performed by the streaming apparatus 110 and one or more external devices connected through a wired or wireless network, in which case the streaming apparatus 110 may generate a game play image based on the result of operations performed distributively by the one or more external devices.

According to still another embodiment, the streaming apparatus 110 may be one or more servers included in a cloud computing environment, in which case generation of the game play image and all operations required for executing the game may be performed distributively by one or more corresponding servers.

The client device 120 is a device used by a user for game play. Specifically, the client device 120 decodes the game play image which is encoded and streamed by the streaming apparatus 110, displays the decoded game play image through a display means of the client device 120, and provides the streaming apparatus 110 with a game manipulation signal, which corresponds to a user input received through an input means of the client device 120 for game manipulation.

The client device 120 may be, for example, a tablet PC, a laptop computer, a smartphone, a smart TV, or the like. However, the client device 120 is not limited to a specific device, as long as it can receive and decode a game play image streamed from the streaming apparatus 110 using a wired or wireless network and output the decoded game play image.

Although, in the illustrated example, direct data transmission and reception is performed between the streaming apparatus 110 and the client device 120, according to an embodiment, a separate relay server (not shown) may be provided to receive data streamed from the streaming apparatus 110, transmit the received data to the client device 120, receive a game manipulation signal transmitted from the client device 120, and transmit the received game manipulation signal to the streaming apparatus 110.

Figure 2:
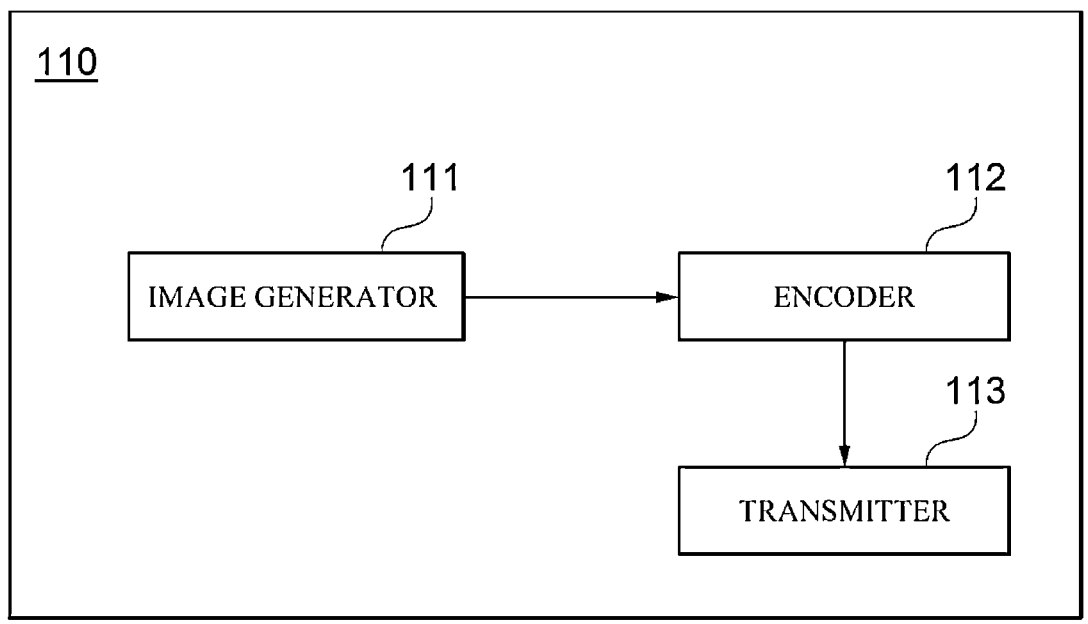
FIG. 2 is a diagram illustrating a configuration of a streaming apparatus according to one embodiment.

FIG. 2 is a diagram illustrating a configuration of a streaming apparatus 110 according to one embodiment.

Referring to FIG. 2, the streaming apparatus 110 according to one embodiment includes an image generator 111, an encoder 112, and a transmitter 113.

In one embodiment, the image generator 111, the encoder 112, and the transmitter 113 are each implemented using one or more physically separated devices, or by one or more hardware processors or a combination of one or more hardware processors and software, and may not be clearly distinguished in a specific operation unlike the illustrated example.

The image generator 111 generates a first image including a part of a plurality of screen elements constituting a game play image and a second image including a remaining part of the plurality of screen elements.

Specifically, the image generator 111 may determine screen elements that will be included in the first image from among a plurality of screen elements constituting the game play image, and then generate the first image and the second image by individually rendering the first image including the determined screen elements and the second image including the remaining screen elements.

In this case, the screen element may mean a graphical object represented in the form of an image or text in the game play image. For example, the screen element may include a scene object (e.g., a game character of a user, a non-player character (NPC), a background image, a health gauge of a game character, a damage level of a game character, and the like) for representing a game-playing scene and a user interface (UI) object (e.g., a menu window, a skill selection window, an UI image, a chatting message, an event notification message, and the like) for representing a UI. However, the screen element is not limited to the above examples and may vary depending on the genre of a game.

According to one embodiment, the screen elements included in the first image may include one or more preset screen elements among the plurality of screen elements constituting the game play image. In this case, the one or more preset screen elements may include, for example, the above-described UI object, but is not necessarily limited thereto. For example, a service operator who provides a game streaming service using the streaming apparatus 110, a game developer, or a user of the client device 120 may preset one or more screen elements required to be clearly expressed within the game play image among the plurality of screen elements constituting the game play image as the screen elements to be included in the first image.

According to one embodiment, the screen elements included in the first image may be determined according to a preset priority for at least some of the plurality of screen elements constituting the game play image and a network status of the client device 120.

For example, assuming that one of the first, second, and third priorities is preset for some of the plurality of screen elements, the image generator 111 may include the screen element given the first priority in the first image when the network status of the client device 120 is less than or equal to a preset first reference value. Also, when the network status of the first client device 120 exceeds the preset first reference value and is less than or equal to a second reference value, the image generator 111 may include the screen element given the first priority and the screen element given the second priority in the first image. Further, when the network status of the client device 120 exceeds the preset second reference value, the image generator 111 may include the screen element given the first priority, the screen element given the second priority, and screen element given the third priority in the first image.

Meanwhile, in the above-described example, the network status of the client device 120 may be determined based on at least one of, for example, bandwidth, packet loss, and packet delay, but the criteria and the measurement method for determining the network status may be changed according to an embodiment.

On the other hand, according to an embodiment, when the game play image is a game play image of an online game provided by interworking with a game server (not shown), the image generator 111 may receive operation results of at least of some of a plurality of operations required for executing the game from the game server, and determine at least one of the plurality of screen elements to be included in the game play image on the basis of the received operation results.

Specifically, when there are one or more operations to be executed in the game server for executing the game in response to a game manipulation signal received from the client device 120, the image generator 111 may request the game server to perform the one or more corresponding operations. Thereafter, the image generator 111 may receive operation results of the requested operations from the game server and determine at least some of the plurality of screen elements that will be included in the game play image on the basis of the received operation results.

For example, in a case where an action to be performed in the game in response to the game manipulation signal received from the client device 120 is a user character's attack to a monster and an operation for determining an attack result (e.g., whether the attack was successful, damage received by the monster, or the like) needs to be performed by the game server, the image generator 111 may request the game server to perform the operation for determining an attack result. Thereafter, when the operation result of the requested operation is received from the game server, the image generator 111 may determine a screen element (e.g., a monster's health gauge, text indicating damage received by the monster, or the like) that will be included in the game play image according to the received operation result.

Figure 3:
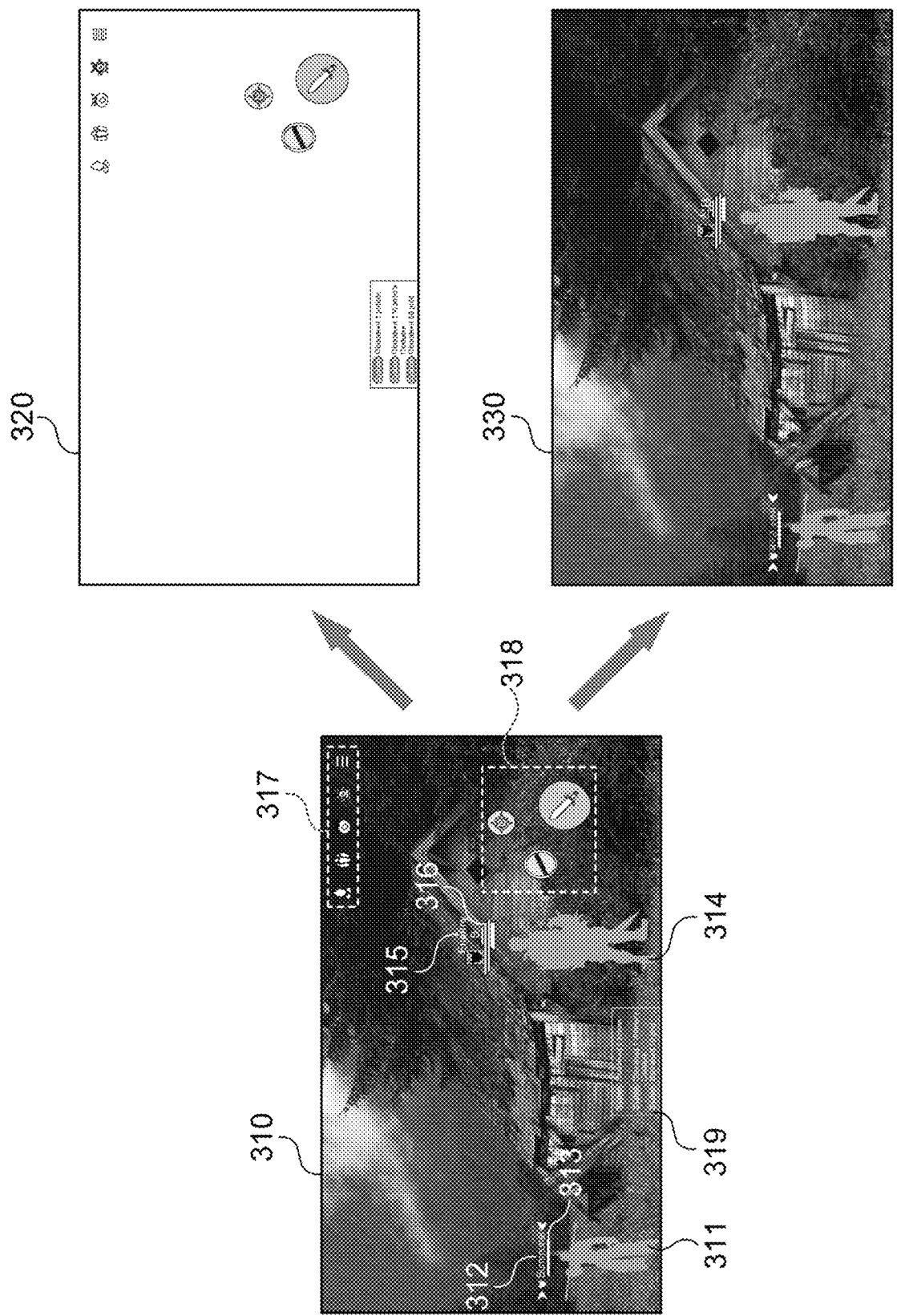
FIG. 3 is a diagram illustrating an example of generating a first image and a second image for a game play image.

FIG. 3 is a diagram illustrating an example of generating a first image and a second image for a game play image.

In the example illustrated in FIG. 3, a game play image 310 includes screen elements, such as a game character 311 of a user, a name 312 and a health gauge 313 of the game character 311, a name 315 and a health gauge 316 of an enemy character 314, UI images 317 and 318, an event notification message 319 indicating an event occurring in a game, and the like.

In this case, the image generator 111 may individually generate a first image 320 that only includes the UI images 317 and 318 and the event notification message 319 among the screen elements 311 to 319 included in the game play image and a second image 330 that includes the remaining screen elements.

In this case, the screen elements 317, 318, and 319 included in the first image 320 may be, for example, screen elements preset to be included in the first image 320, but may be screen elements determined based on a preset priority and a network status of the client device 120 according to an embodiment.

Referring back to FIG. 2, the encoder 112 determines an image quality for each of the first image and the second image such that the image quality of the first image is higher than or equal to that of the second image, and encodes the first image and the second image based on the determined image qualities.

In this case, according to an embodiment, the image quality may include at least one of a resolution, a frame rate, a compression rate, and a bit rate.

According to one embodiment, the encoder 112 may encode each of the first image and the second image using a standard video codec, such as H.264, MPEG-2, MPEG-4, or the like. However, the encoder 112 may encode each of the first image and the second image using various video encoding methods in addition to the aforementioned examples, and the video encoding methods for encoding the first image and the second image may be different from or the same as each other.

According to one embodiment, the encoder 112 may determine the image quality of the first image on the basis of a preset image quality.

For example, the encoder 112 may determine the image quality of the first image such that the first image has the preset image quality. That is, the encoder 112 may maintain the image quality of the first image at the preset image quality.

In another example, the encoder 112 may determine the image quality of the first image on the basis of the network status of the client device 120 such that the image quality of the first image is maintained higher than or equal to the preset image quality. Specifically, the encoder 112 may change at least one of the resolution, frame rate, compression rate, and bit rate of the first image based on the network status of the client device 120, such that the changed image quality is greater than or equal to a preset value.

According to one embodiment, the encoder 112 may determine the image quality of the second image on the basis of the network status of the client device 120.

Specifically, the encoder 112 may change at least one of the resolution, frame rate, compression rate, and bit rate of the second image based on the network status of the client device 120, and the image quality of the second image may be lower than that of the first image.

The transmitter 113 streams each of the first image and the second image that are encoded by the encoder 112 to the client device 120.

Specifically, the transmitter 113 may stream each of the encoded first image and the encoded second image according to a known streaming protocol, such as Real Time Streaming Protocol (RTSP), Http Live Streaming (HLS), or the like.

Meanwhile, the client device 120 may decode the first image and the second image streamed by the transmitter 113, and then may synthesize the decoded first image and second image to reproduce the game play image.

Figure 4:
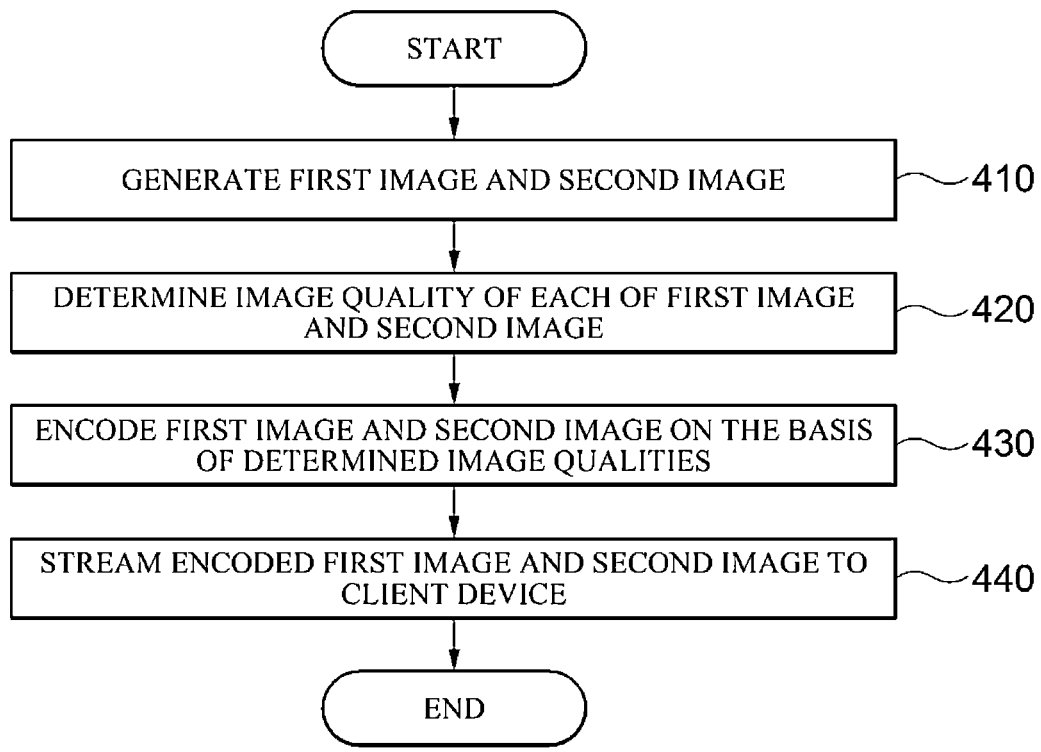
FIG. 4 is a flowchart illustrating a streaming method according to one embodiment.

FIG. 4 is a flowchart illustrating a streaming method according to one embodiment.

Referring to FIG. 4, first, a streaming apparatus 110 generates a first image including a part of a plurality of screen elements constituting a game play image and a second image including a remaining part of the plurality of screen elements (410).

According to one embodiment, the screen elements included in the first image may include one or more preset screen elements among the plurality of screen elements constituting the game play image. In this case, the one or more preset screen elements may include a UI object.

Further, according to one embodiment, the screen elements included in the first image may be determined based on a priority set for at least some of the plurality of screen elements constituting the game play image and the network status of a client device 120.

Thereafter, the streaming apparatus 110 determines the image quality for each of the first image and the second image so that the generated image quality of the first image is equal to or higher than that of the second image (420).

According to one embodiment, the streaming apparatus 110 may determine the image quality of the first image on the basis of a preset image quality.

For example, the streaming apparatus 110 may determine the image quality of the first image so that the first image has the preset image quality.

In another example, the streaming apparatus 110 may determine the image quality of the first image based on the network status of the client device 120 such that the image video quality of the first image is maintained higher than or equal to the preset video quality.

Thereafter, the streaming apparatus 110 encodes each of the first image and the second image on the basis of the determined image quality (430).

Then, the streaming apparatus 110 streams the encoded first image and the second image to the client device 120 (440).

Meanwhile, in the flowchart illustrated in FIG. 4, at least some of the operations may be performed in different order or may be combined into fewer operations or further divided into more operations. In addition, some of the operations may be omitted, or one or more extra operations, which are not illustrated, may be added to the flowchart and be performed.

Figure 5:
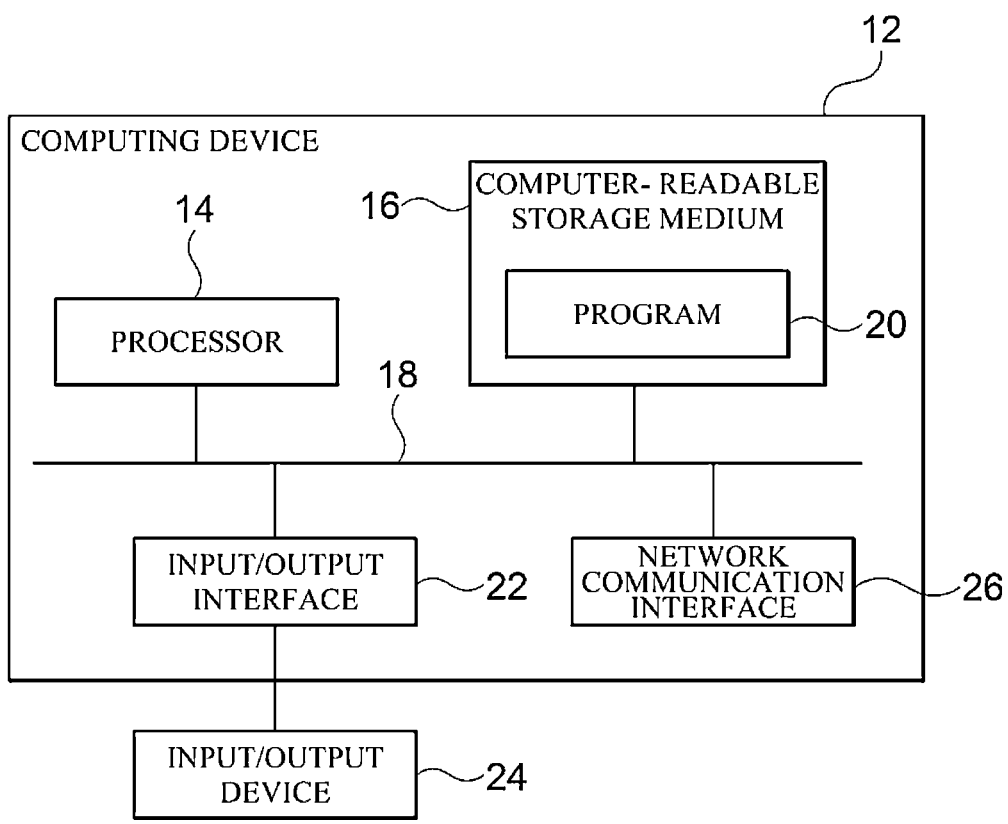
FIG. 5 is a block diagram illustrating an example of a computing environment including a computing device according to one embodiment.

FIG. 5 is a block diagram illustrating an example of a computing environment including a computing device according to one embodiment.

In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the streaming apparatus 110 shown in FIGS. 1 and 2.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, after a first image including a part of a plurality of screen elements constituting a game play image and a second image including a remaining part of the plurality of screen elements are generated, the first image is encoded such that an image quality of the first image is higher than or equal to that of the second image, and then the first image and the second image are streamed to a client device, thereby improving the responsiveness of the game play while ensuring the clarity of the game play image reproduced on the client device.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A streaming method comprising:
   identifying, from a game play image that is currently displayed on a screen, a user interface (UI) object and a scene object from among a plurality of screen elements constituting the game play image;
   generating, based on the game play image, a first image constituted by the identified UI object without the identified scene object and a second image constituted by the identified scene object without the identified UI object;
   determining an image quality of each of the first image and the second image such that the image quality of the first image is higher than or equal to the image quality of the second image;
   encoding each of the first image and the second image based on the determined image quality of each of the first image and the second image; and
   streaming the encoded first image and the encoded second image to a client device.

2. The streaming method of claim 1, wherein the generating comprises determining a screen element to be included in the first image from among the plurality of screen elements based on a priority set for at least some of the plurality of screen elements and a network status of the client device.

3. The streaming method of claim 1, wherein the determining comprises determining the image quality of the first image based on a preset image quality.

4. The streaming method of claim 3, wherein the determining comprises determining the image quality of the first image such that the first image has the preset image quality.

5. The streaming method of claim 3, wherein the determining comprises determining the image quality of the first image based on a network status of the client device such that the image quality of the first image is maintained higher than or equal to the preset image quality.

6. The streaming method of claim 1, wherein the determining comprises determining the image quality of the second image based on a network status of the client device.

7. The streaming method of claim 1, wherein at least some of the plurality of screen elements are determined based on an operation result executed by a game server.

8. A streaming apparatus comprising:
   one or more hardware processors; and
   one or more communication interfaces,
   wherein the one or more hardware processors are configured to:
   identify, from a game play image that is currently displayed on a screen, a user interface (UI) object and a scene object from among a plurality of screen elements constituting the game play image;
   generate, based on the game play image, a first image constituted by the identified UI object without the identified scene object and a second image constituted by the identified scene object without the identified UI object,
   determine an image quality of each of the first image and the second image such that the image quality of the first image is higher than or equal to the image quality of the second image,
   encode each of the first image and the second image based on the determined image quality of each of the first image and the second image, and
   stream the encoded first image and the encoded second image to a client device.

9. The streaming apparatus of claim 8, wherein the one or more processors are further configured to determine a screen element to be included in the first image from among the plurality of screen elements based on a priority set for at least some of the plurality of screen elements and a network status of the client device.

10. The streaming apparatus of claim 8, wherein the one or more processors are further configured to determine the image quality of the first image based on a preset image quality.

11. The streaming apparatus of claim 10, wherein the one or more processors are further configured to determine the image quality of the first image such that the first image has the preset image quality.

12. The streaming apparatus of claim 10, wherein the one or more processors are further configured to determine the image quality of the first image based on a network status of the client device such that the image quality of the first image is maintained higher than or equal to the preset image quality.

13. The streaming apparatus of claim 8, wherein the one or more processors are further configured to determine the image quality of the second image based on a network status of the client device.

14. The streaming apparatus of claim 8, wherein at least some of the plurality of screen elements are determined based on an operation result executed by a game server.

15. The streaming method of claim 1, wherein, in the generating the first image, an amount of the UI object to be included in the first image changes based on a network status of the client device.

16. A streaming method comprising:
   identifying, from a game play image that is currently displayed on a screen, a user interface (UI) object and a scene object from among a plurality of screen elements constituting the game play image;
   generating a first image constituted by the identified UI object and a second image constituted by the identified scene object;
   determining an image quality of each of the first image and the second image such that the image quality of the first image is higher than or equal to the image quality of the second image;
   encoding each of the first image and the second image based on the determined image quality of each of the first image and the second image; and streaming the encoded first image and the encoded second image to a client device,
wherein an amount of the UI object to be included in the first image increases or decreases based on a result of comparison between a value of a network status of the client device and a preset reference value.

* * * * *